(12) United States Patent
Milewski et al.

(10) Patent No.: US 9,164,975 B2
(45) Date of Patent: Oct. 20, 2015

(54) SYSTEM AND METHOD FOR VIEWING AND MARKING MAPS

(71) Applicant: Monmouth University, West Long Branch, NJ (US)

(72) Inventors: Allen E. Milewski, Keyport, NJ (US); Barbara T. Reagor, Oceanport, NJ (US); Robert S. Bekefi, Brick, NJ (US); William F. Tepfenhart, Little Silver, NJ (US); Lauren C. Landrigan, Havre de Grace, MD (US)

(73) Assignee: MONMOUTH UNIVERSITY, West Long Branch, NJ (US)

( * ) Notice: Subject to any disclaimer, the term of this patent is extended or adjusted under 35 U.S.C. 154(b) by 187 days.

(21) Appl. No.: 13/958,166

(22) Filed: Aug. 2, 2013

(65) Prior Publication Data

US 2013/0318427 A1 Nov. 28, 2013

Related U.S. Application Data

(63) Continuation-in-part of application No. 13/000,960, filed on Dec. 22, 2010, now abandoned.

(60) Provisional application No. 61/075,027, filed on Jun. 24, 2008.

(51) Int. Cl.
*G06F 17/24* (2006.01)
*G06F 17/30* (2006.01)
*A62B 99/00* (2009.01)

(52) U.S. Cl.
CPC ........ *G06F 17/241* (2013.01); *G06F 17/30241* (2013.01); *A62B 99/00* (2013.01)

(58) Field of Classification Search
None
See application file for complete search history.

(56) References Cited

U.S. PATENT DOCUMENTS

| | | | |
|---|---|---|---|
| 2,586,017 A | 2/1952 | Freedman | |
| 4,371,893 A | 2/1983 | Rabeisen | |
| 4,727,431 A | 2/1988 | Nakamura et al. | |
| 5,029,899 A | 7/1991 | Schieppati et al. | |
| 5,239,373 A | 8/1993 | Tang et al. | |
| 5,647,156 A | 7/1997 | Hull et al. | |
| 5,682,525 A | 10/1997 | Bouve et al. | |
| 5,732,978 A | 3/1998 | Tunnell | |
| 5,848,373 A * | 12/1998 | DeLorme et al. | 701/455 |
| 6,574,561 B2 | 6/2003 | Alexander et al. | |
| 6,839,403 B1 | 1/2005 | Kotowski et al. | |
| 7,427,983 B1 | 9/2008 | Hidebrandt et al. | |
| 7,551,312 B1 * | 6/2009 | Hull et al. | 358/1.18 |

(Continued)

OTHER PUBLICATIONS

Landrigan, Lauren C. et al. "Paer or Pixels? Enhanced Paper Maps for Emergency Operations", IEEE, Jan. 8, 2007, pp. 2508-2513, USA.

*Primary Examiner* — Stephen R Koziol
*Assistant Examiner* — Jason Pringle-Parker
(74) *Attorney, Agent, or Firm* — Keith D. Nowak; Carter Ledyard & Milburn LLP

(57) ABSTRACT

The present invention is directed to a method and device for obtaining, viewing and marking maps in real time. Maps are obtained from a list of maps, the maps are then viewed on interactive tabletop displays allowing a user to visualize a mapped location and "markup" points on the map. The markup data is captured as a small file and sent out to responders via rapid transmission in both real time as it is developed or as final actionable information. The maps employed in the present invention include land maps or building floor plans that are either in paper or digital formats.

1 Claim, 8 Drawing Sheets

(56) References Cited

U.S. PATENT DOCUMENTS

| | | |
|---|---|---|
| 7,805,246 B2 * | 9/2010 | Chakrapani et al. ............... 702/5 |
| 2001/0026271 A1 | 10/2001 | Higgins et al. |
| 2002/0149617 A1 * | 10/2002 | Becker .......................... 345/751 |
| 2002/0167536 A1 | 11/2002 | Valdes et al. |
| 2003/0095155 A1 | 5/2003 | Johnson |
| 2003/0137496 A1 * | 7/2003 | Stevens et al. ................ 345/173 |
| 2004/0150627 A1 | 8/2004 | Luman et al. |
| 2004/0174386 A1 | 9/2004 | Kotake et al. |
| 2005/0034062 A1 | 2/2005 | Bufkin et al. |
| 2005/0206770 A1 | 9/2005 | Nathanson et al. |
| 2006/0058949 A1 | 3/2006 | Fogel et al. |
| 2006/0072144 A1 | 4/2006 | Dowling et al. |
| 2006/0098899 A1 * | 5/2006 | King et al. .................... 382/305 |
| 2007/0288164 A1 | 12/2007 | Gordon et al. |
| 2008/0186255 A1 * | 8/2008 | Cohen et al. ...................... 345/8 |
| 2009/0309846 A1 * | 12/2009 | Trachtenberg et al. ....... 345/173 |
| 2010/0171755 A1 | 7/2010 | Tunnell |

* cited by examiner

SYSTEM AND METHOD FOR VIEWING AND MARKING MAPS

PRIORITY AND RELATED APPLICATION

This application is a continuation in part of U.S. patent application Ser. No. 13/000,960 filed Dec. 22, 2010, which further claims priority to U.S. Provisional Patent Application Ser. No. 61/075,027, filed Jun. 24, 2008, and PCT Patent Application No. PCT/2009/048437 filed Jun. 24, 2009 entitled "SYSTEM AND METHOD FOR VIEWING AND MARKING MAPS," both of which are hereby incorporated by reference in their entirety.

FIELD OF THE INVENTION

The present invention relates to the dissemination of information useful in emergency situations and specifically to mapping applications providing maps on interactive tabletop displays effective in viewing, marking and disseminating the maps to remote locations.

BACKGROUND OF THE INVENTION

The time it takes to respond to a natural or man-made disaster can mean the difference between life and death. Emergency Operation Centers (EOCs) are usually set up near the disaster zones to enhance the response time to disasters. EOCs are physical worksites that serve to receive data, assess the situation, and decide how to control or end the emergency. EOCs may be found at one or more government levels, for instance on the federal, state, county and local levels.

Impediments to the effectiveness of the EOC can arise based on the skill level of the personnel and the quality of communication systems used by the EOC. Each EOC is run by trained individuals, one such individual being incident managers. However, EOC personnel may also include untrained volunteers. It is critical that EOC tools utilize natural interactions since the training level of EOC personnel can vary drastically from highly experienced to little or no training. For less experienced workers and even highly trained but computer-illiterate individuals, natural forms of interaction can facilitate usability of EOC tools by increasing the tools transparency and speed of learning. By incorporating natural forms of interaction with EOC tools, strong mental modes are evoked in users based on their past experiences with other systems.

Traditionally personnel in EOCs used paper maps to locate disasters and to chart movement. However, paper maps may at times be out of date and difficult to obtain and therefore the traditional paper and pencil mapping methods may prove inadequate to provide rapid responses to rapidly changing conditions inherent in a disaster. The fatalities realized on Sep. 18, 2003 when Hurricane Isabel hit North Carolina clearly highlight the deficiency of using paper maps to track a disaster. Here, EOCs used geographical information systems (GIS) to overlay storm information with digital maps of properties, structures, power utilities and roads. As a result, responders were effectively dispatched to locales that required the most attention. As the storm moved to remote areas, the only land map information available were from paper maps. EOCs were no longer able to track the hurricane. The level of response to these areas was hampered due to the inability to follow the track of the disaster over land. If the level of technology had been better, these remote areas would have been served better by EOCs responders. The need to identify patterns and changes to emergency situations are facilitated by using maps and other spatial information that allows a user to more realistically assess a condition and formulate appropriate responses.

The quick nature of disasters requires state-of-the-art communication devices in order to advise individuals of breaking developments and respond accordingly. The types of technologies employed in EOCs range widely based on size of the emergency and budgets allocated to the centers. Best results, such as a quickly resolved emergency, is achieved when communication between EOCs and responders are efficient. Computer or laptop graphical user interface is an advancement over using paper and pen, however it still lacks ease in use and natural forms of interaction.

U.S. Pat. No. 6,574,561 entitled Emergency Management System is an example of a system for automating the gathering of field information that describes the condition of specific geographical locations at specific times via a field information recording device. Such systems are an advance to gathering real-time information. However, the information still needs to be reviewed by emergency personnel and an actionable plan needs to be developed based on the circumstances by such personnel reviewing the data in real time.

Even with the availability of technology rich data systems, there is a need for a low cost, low technology solution for transmitting actionable information pertaining to location and geography from the field to the EOC and vice versa. The solutions should be easy to use especially by computer-illiterate individuals who prefer using paper and pencil. Tools that utilize natural interactions, gracefully degrade, support collaboration and display spatially referenced information is desired in workplaces such as EOCs.

The transmission of information using the low technology solutions must be done quickly and at a low bandwidth. Ideally, disaster information should be conveyed by rapid transmission being either wired or wireless. Suitable non-limiting methods or devices capable of carrying out rapid transmission include email, FTP, cellular service, satellite, WiFi, broadband, narrowband and the like. There is also a need to ensure effective collaboration between EOCs and first responders to ensure all participants are informed with the most accurate and latest actionable information.

BRIEF SUMMARY OF THE INVENTION

The present invention is directed to a method and device for obtaining, viewing and marking maps. Maps are obtained from a list of maps. These maps can be enhanced with data overlays provided by systems similar to that described in U.S. Pat. No. 6,574,561 entitled Emergency Management System, weather maps or maps generated by civilian emergency management systems like E-Team, WebEOC or military systems like JWARN and JEM. The maps and their overlays can create actionable decisions that are then viewed on interactive tabletop displays allowing a user to visualize a mapped location and "markup" data on the map. The markup data is captured as a small file and sent out to responders via rapid transmission (networked computers, email . . . etc.). The maps employed in the present invention include land maps or building floor plans that are either in paper or digital formats, and that can be enhanced through overlays of information from other data sources.

The present invention further provides a method for annotating maps and conveying said annotations by selecting a map from a database and displaying the map on a display surface. When using a digital map, it is displayed in a known location/orientation by the system. When using a paper map, it must be oriented on the display surface to align with control points whose locations are known by the system Annotations made on the map are geo-referenced with map extents or map coordinates. The saved annotations are then transmitted from an origination location to a second location using transmission means.

DETAILED DESCRIPTION OF THE INVENTION

The present invention provides a method and a device for obtaining, viewing and marking maps and/or similar sources of information and saving the marked information as a digital file. It is to be understood that when referring to "maps" this designation can include non-limiting examples such as land maps and building floor plans as well as other sources of information. Suitable examples of land maps include street maps, satellite maps, maps generated by other emergency management systems compatible with ESRI standards, etc. showing any range of details including trees, bodies of water, homes, hills, mountains, etc. Examples of building floor layouts include location information on individual floors and multiple floors such as room layouts and exit routes found in such systems as FloorView™, etc.

Figure 6:
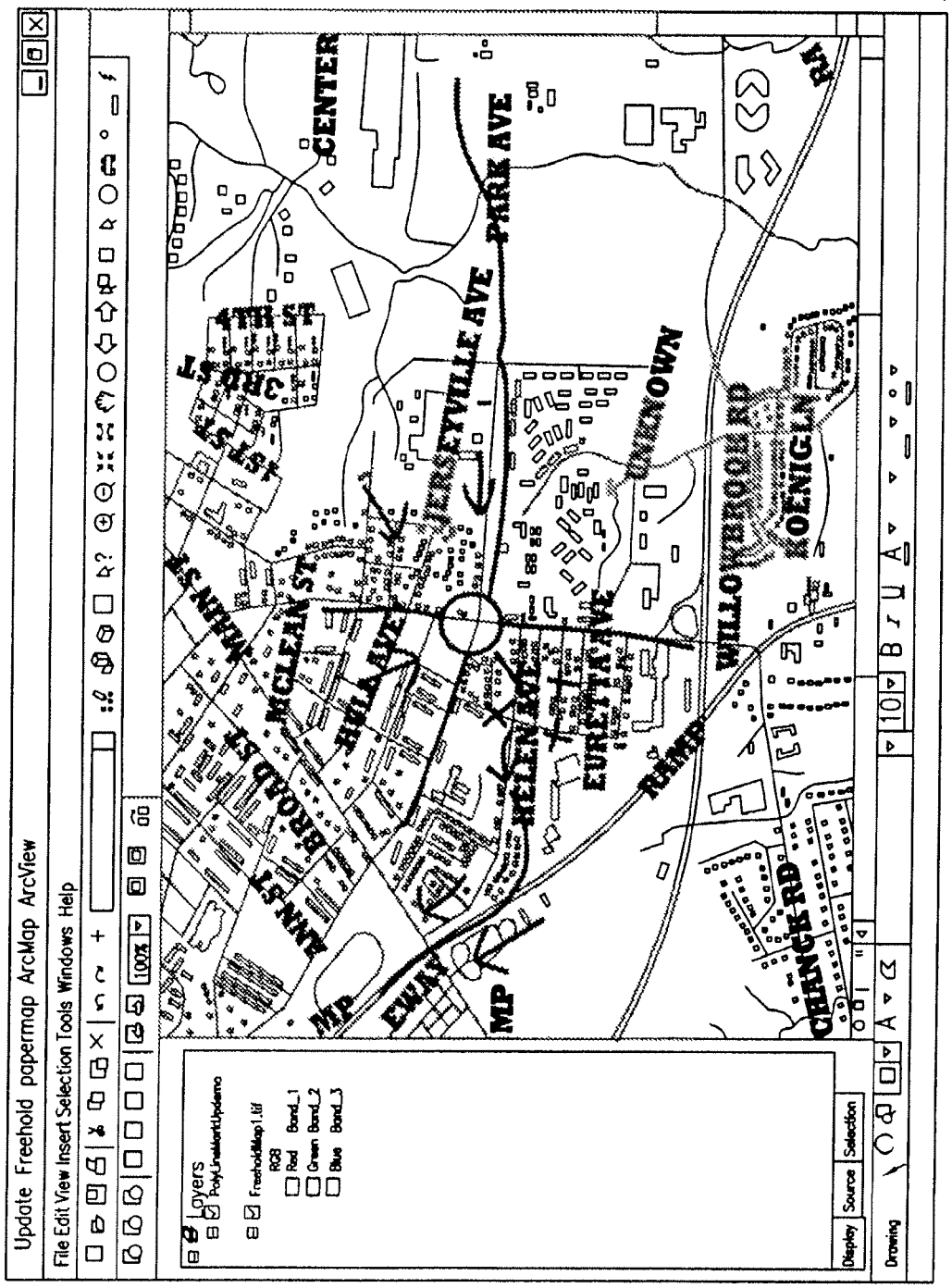
FIG. 6 shows an example of the markup information being shared by email.
Figure 7:
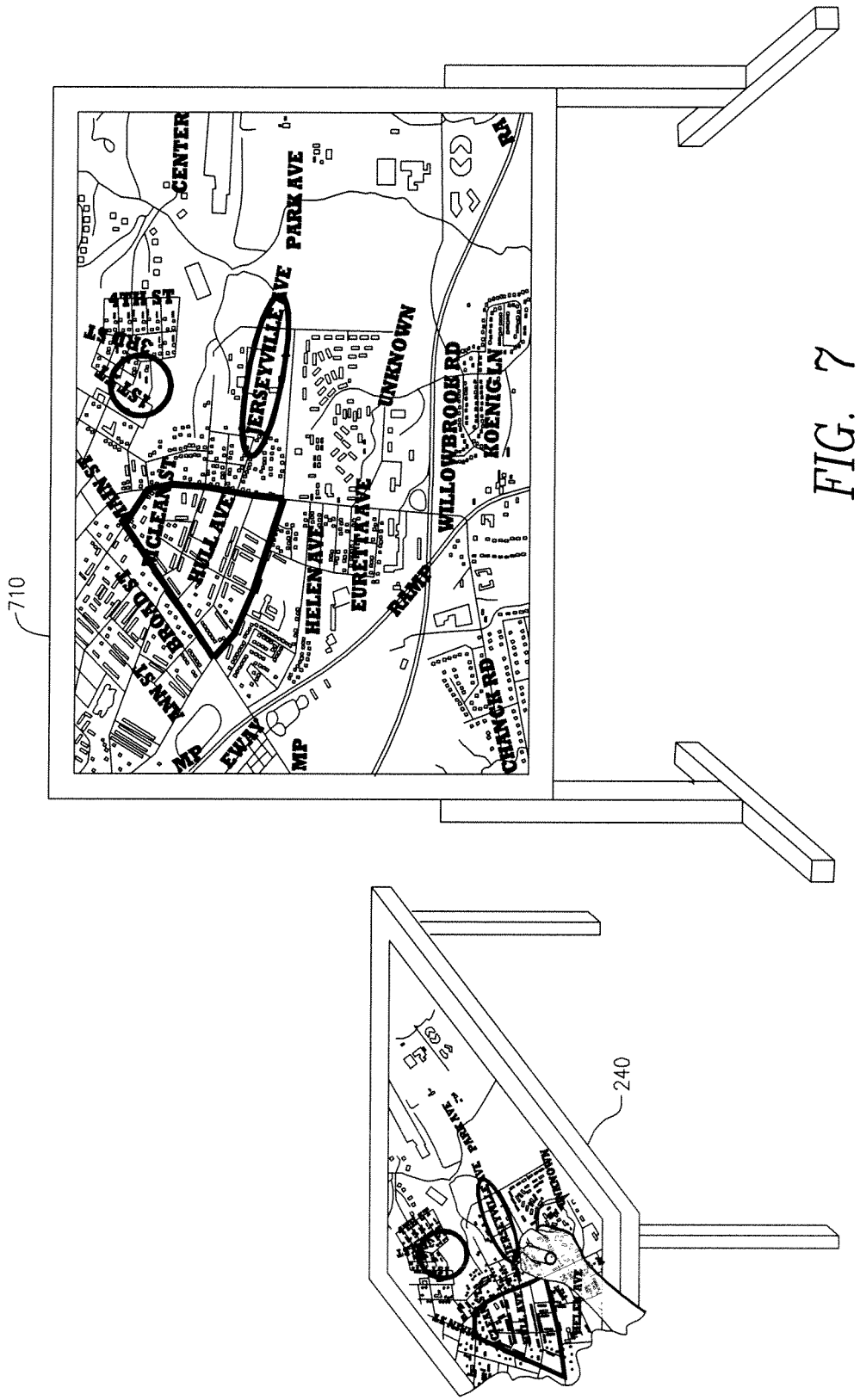
FIG. 7 shows an example of the mark-up data being created and simultaneously being viewed on a networked projection monitor.

The saved digital file can then be transmitted to a remote user by rapid transmission that is wired or wireless as shown in FIG. 6. The file during creation can be viewed on multiple network sources as shown in FIG. 7. Suitable non-limiting methods or devices capable of carrying out rapid transmission include email, FTP, cellular service, satellite, WiFi, broadband, narrowband and the like. The present invention also provides users with a physical map updated with the latest information. Use of maps and other spatial information in Emergency Operation Centers (EOCs) allow emergency personnel to more realistically assess disaster situations and create real time actionable plans that can be rapidly shared with others.

By providing information in a spatially referenced context, users (emergency managers) are able to visually digest the information and physically identify patterns and changes to an emergency. Spatially referencing or geo-referencing means to define the existence of something in physical space, to provide context to something with respect to coordinate locations. In one embodiment, context or coordinate locations include but is not limited to map projections, coordinate systems that are relative to the earth, etc. One easy to understand example of map coordinates is longitude and latitude. Other map coordinates include Military Grid Reference Systems (MGRS), Universal Transverse Mercator coordinate system (UTM), etc.

Figure 5:
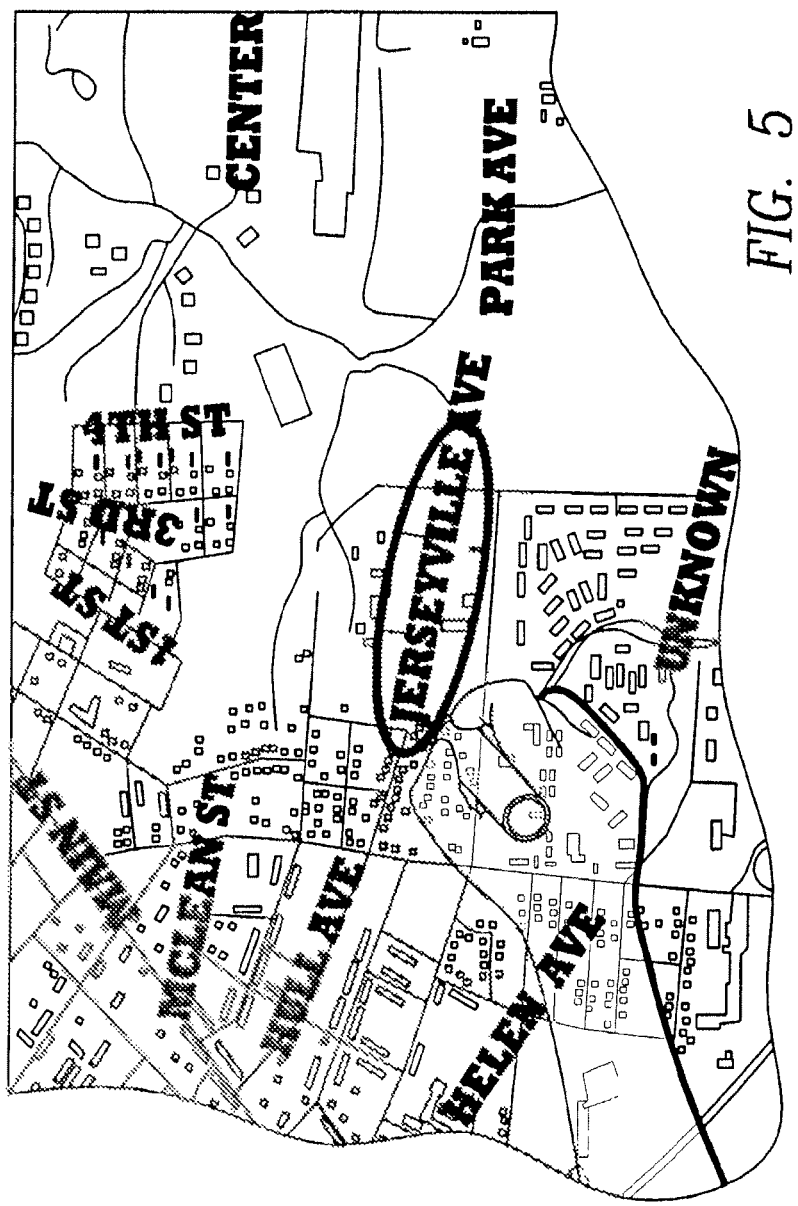
FIG. 5 shows an example of the Mark-up data being created.

Geo-referencing allows markup data, such as annotations, to be printed and/or transferred from one location to another. Geo-referencing occurs by translating markup data having X-Y coordinates of a display into map coordinates (i.e. longitude and latitude information) of a map. In an embodiment where map coordinates use longitude and latitude information the invention will calibrate between the x-y coordinate of the display and the geographic longitude and latitude coordinates of the land map. These longitude and latitude coordinates can be layered on top of maps in a receiving device, provided the receiving device has a way of displaying features from their longitude and latitude. For instance, if a creator makes markups, see FIG. 5, on a first map viewed on top of a display surface/map area 240, see FIG. 2, those markups are defined in the X-Y coordinates of the display. The X-Y coordinates of the display are then geo-referenced with the map coordinates of the first map placed on the display. Geo-referencing can occur in a number of way such as by using ArcGIS, or other map engines or, in some cases, using control points. The geo-referenced annotations alone are then saved and can be transmitted to a second location. When the markups are transferred to a user at the second location/display 710 the user at the second location/display 710 has or makes a copy of the first map and displays the markups on the first map. The markups that are displayed on the second location/display 710 will be in the same geographic orientation as the markups made on the first map by the creator. See FIG. 7. Said another way, the map coordinates of the annotations made on the first map are preserved when the annotations are transmitted and then displayed on the copy of the map at the second location.

Figure 1:
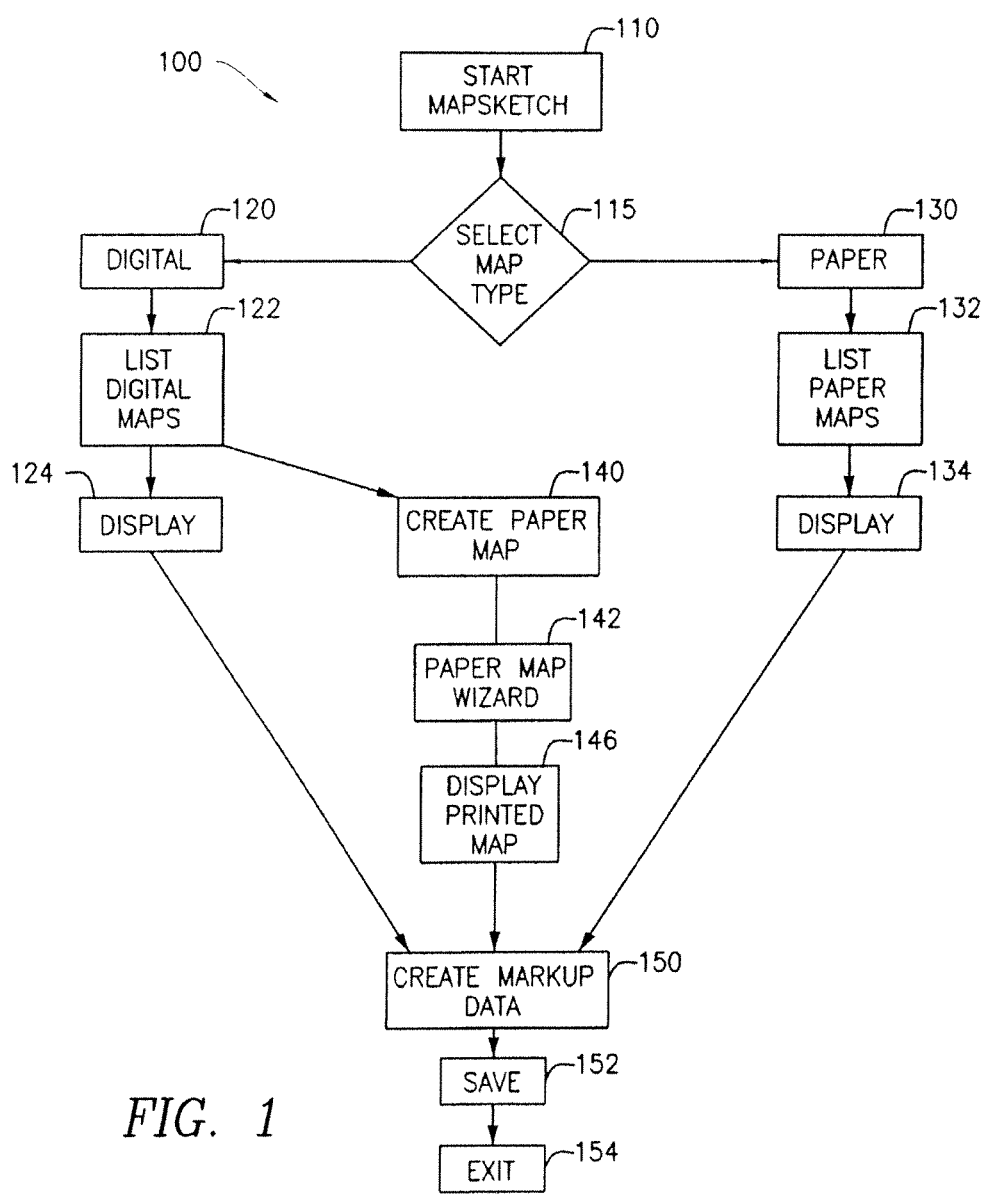
FIG. 1 illustrates a flowchart showing the overall scheme of the present invention.

FIG. 1 shows a flowchart displaying the overall scheme of the present invention. The invention 100 is initiated by starting a MapSketch application 110. The user is first prompted to select map type 115, being either a digital map 120 or a paper map 130. If the user desires using the digital map 120, a screen will be displayed showing a list 122 of available digital maps in the system's library and the user selects the relevant digital map. One form of the digital map is displayed at 124 on an interactive table 210 (see FIG. 2) and the user can create mark up data 150 on the map. Once the user is finished marking or annotating the map, the mark up data is saved 152 and the application is exited at 154. Markup data or annotations can include drawings, writings and symbols made on the map. The markup data should be stored in a file separate from the digital map in order to keep the file small. The markup data will be saved with map extents but will not be saved in context with the display coordinates of the display device which was used to create the markups. Saved final data can be transmitted to field personnel by email, FTP, cellular service, satellite, WiFi, broadband, narrowband and the like.

If the user, instead, prefers to annotate a paper map, the user selects the paper map feature at 130. The user is then presented with a list 132 of registered paper maps and selects the relevant paper map. Like the digital map, the registered paper map contains the minimum and maximum coordinates of the area, called the "extents" or "map extents" of the map. However the registered paper map will have an extra set of information being control point markup data. Map extents will be whatever map coordinate system used with the map being displayed. In one embodiment, map extents for a land map may be standard earth coordinate systems such as but not limited to longitude, latitude and versions thereof. Longitude, for example, is a measure of angular distance east or west from a specific meridian that runs from pole to pole. Latitude is the angle between the equatorial plane and a line that passes through that point relative to the shape of the earth. Map extents for plans such as a floor plan for instance may be the number of rooms or exits on the plan. Other non-limiting examples of map coordinates for map extents may include Military Grid Reference Systems (MGRS), Universal Transverse Mercator coordinate system (UTM), etc. Control point markup data, called "Paper Map Layer" is a special type of markup data file that indicate three points and will be discussed further below.

The extents of the map and the control points play roles in ensuring that the paper map is printed accurately and oriented properly on the interactive tabletop 210 and that the markup data is captured in the correct geographic location, geo-referenced. The printed map should retain the extents of the map to show the relevant area. Once the desired paper map is selected at 132 it is printed and displayed at 134 on the interactive table 210. Then a creator is allowed to create markup data 150, the markup data is then saved in a file 152, and the creator exits the application at 154. To properly display the printed paper map at 134 on the table 210 (see FIG. 2), the map must have proper extents and control points that align with the control points on the table. Since paper maps can change in size due to temperature and humidity, their location/orientation on the display area must be calibrated with each use. The calibration or geo-referencing system of the present invention has been developed and included in the invention to insure proper sizing. This system matches the control points to the map coordinates (ie. latitude and longitude) overlays, such that annotated markings can be converted onto a digital or paper map at a new location. This system is further discussed below.

If the user is unable to locate an appropriate paper map from the list of paper maps 132, the user can create a paper map from the list of digital maps at 122. After selecting a digital map at 120, the list 122 of digital maps is displayed and a digital version of the area in interest is located. The user loads the map with extents already determined and selects a "Create Paper Map" 140 feature to open a "Paper Map Wizard" 142 program of the present invention 100.

The "Paper Map Wizard" feature 142 guides the user to create a paper map from a digital map. The first step is to identify three control points on the digital map. Control point identification occurs by tapping an input device (ie: a mimio marker) at the physical control points defined on the display surface/map area 240. The "Paper Map Wizard" feature 142 confirms when all three points have been saved by the system and stores these points as a special type of markup layer, called the "Paper Map Layer" along with the extent of the map. The "Paper Map Layer" file is stored in the same directory as the digital map. After saving the file and adding the created map to the list 122 of digital maps, the user prints the map with the "Paper Map Layer" information printed on top and displays the printed map at 146 on table 210. The control points stored in the "Paper Map Layer" information will be reflected in the printed copy of the map and should be the same distance apart as the control points on the table. As mentioned above, the control points and the extents ensure that the markup data created on the paper map is correctly geo-referenced and displayed with the proper orientation on the digital map. Once the map is printed, the user is able to create mark up data 150, save the markup in a file 152 and exit the program at 154.

The present invention enables a creator to create map annotations on a first map, geo-reference the map annotations, save the geo-referenced map annotations in a file and send the file to a copy of the map at a second location. The file sent to the second location will be displayed on a copy of the first map while preserving the orientation of the markups/map annotations made on the first map. As mentioned above geo-referencing may occur by using ArcGIS, or similar map engines. In one embodiment of when a paper map is created, the control points are used to geo-reference or translate between the display surface control points (such as X-Y coordinates) and the extents or geographical coordinates location (such as longitude-latitude coordinates) of the geographical places. Once the markup data is geo-referenced there is complete translation between display coordinates and the map extents or map coordinates.

Figure 8:
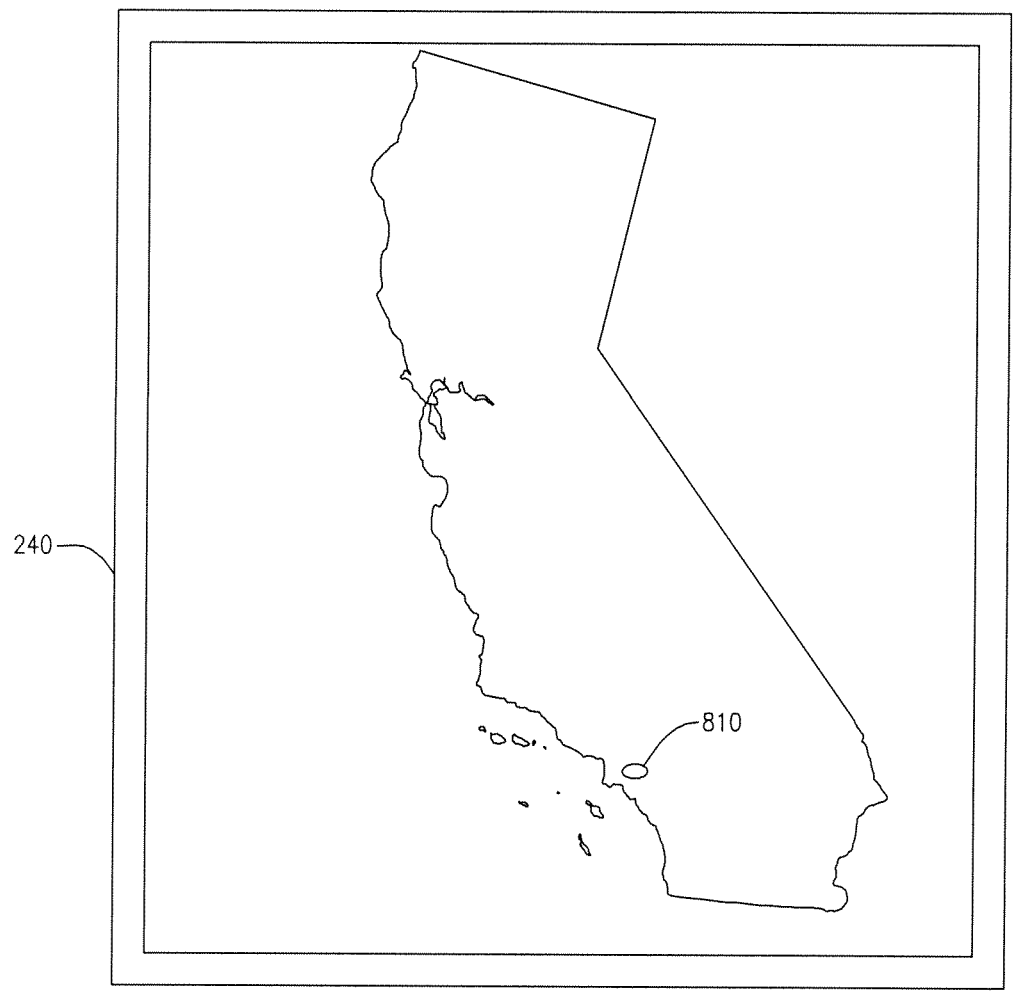
FIG. 8 shows a map of California used in employing the method of the present invention.

Referring now to FIG. 8 a registered map of California is selected from the map database and displayed on a map area or display surface 240. A circular marking or markup 810 is made on a map of California to identify the city of Los Angeles. Under the present invention, this markup data or map annotation which identifies Los Angeles would have display system X-Y coordinate of approximately x=1.3 inches, y=0.5 inches from the bottom left corner of the display. The X-Y coordinates of the display area are then geo-referenced or translated into map extents or map system earth coordinates being latitude-longitude (lat-long) of 34.0522° N, 118.2428° W. The extents of the geo-referenced map annotations are saved separate and apart from the image of the map and control point data. When the saved geo-referenced markup data 810 is transferred to a second display surface the markup data 810 will be displayed at the second location in the same orientation as when the markup 810 was created. Orientation of the markup data is preserved from creation to transmission and display at a second location due to the geo-referencing of the markup data 810. The second location will display a copy of the registered map that was used to create the markup data 810 and thus the map extents in the copy of the map at the second location will be matched to the map extents of the markup data that were transmitted in the saved geo-referenced markup data file.

Figure 2:
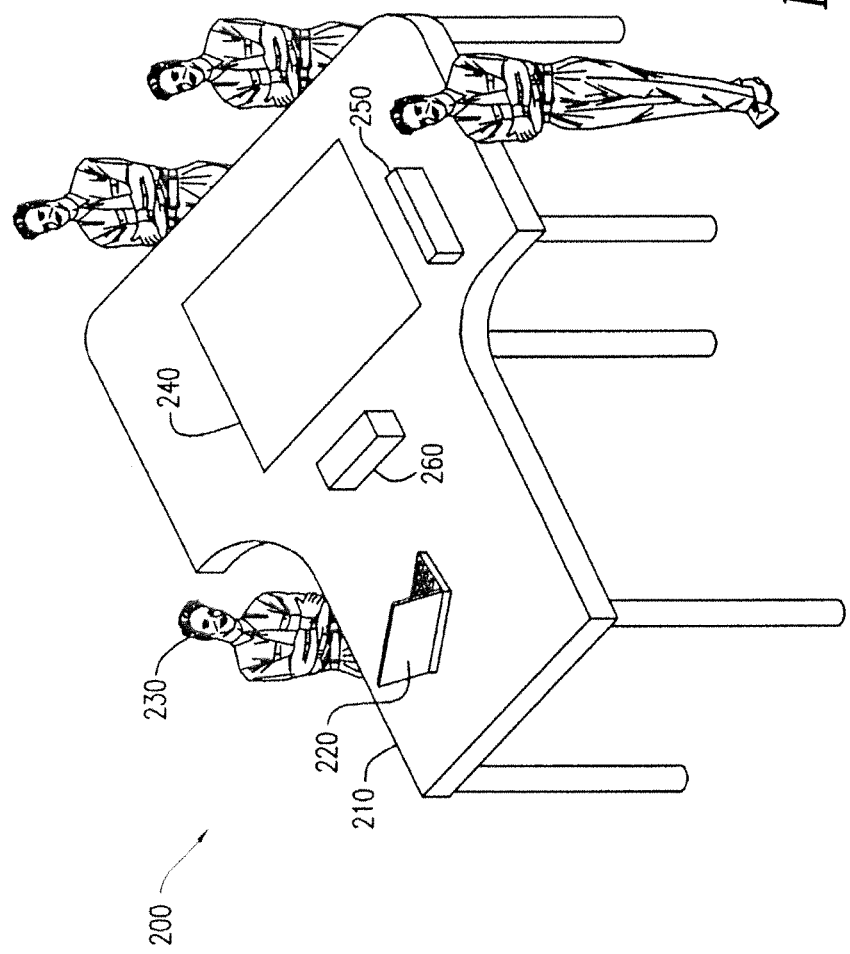
FIG. 2 illustrates an environmental perspective view of a workspace according to the present invention.
Figure 4:
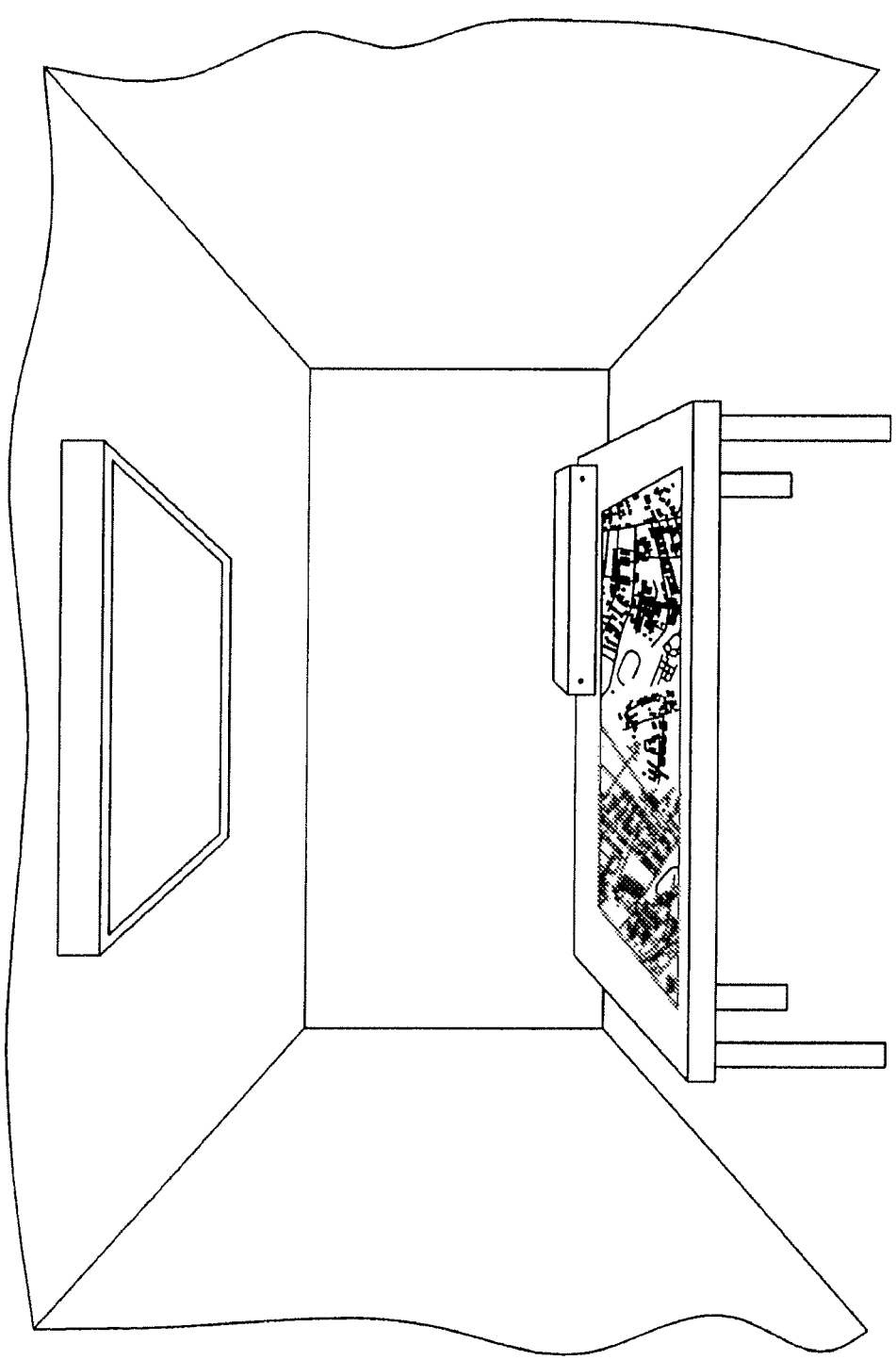
FIG. 4 illustrates an environmental perspective view of a workspace according to an alternative embodiment of the present invention.

Referring now to FIG. 2, a design of a workspace 200 specific for the present invention is shown. The workspace 200 shows the interactive table 210, computer 220, users 230, a map area 240, a capture device 250, a storage box 260 and an overhead projector (not shown). The table 210 is large enough to accommodate a number of users 230, the map area 240, the capture device 250 and the computer 220. As mentioned above, use of the interactive table 210 promotes natural interaction. For instance, the table 210 provides a large surface for users to place notepads, pens and other tools. The present invention is further conducive for natural interactions in that users 230 are permitted to gather around the table 210 to discuss plans and make decisions face-to-face. Additional designs have been generated as prototypes to account for changes in available space as shown in FIG. 4.

The table may have a generally T-shaped appearance. Although dimensions can vary, a typical table may have an overall length and width of 72"×48." A top portion of the "T" can be about 48"×48" and a bottom portion of the "T" being about 24"×32". The corners of the table 210 may be rounded or curved to facilitate easy movement around the table 210.

The table used in the present invention, however, may be of any shape or size to accommodate either a paper or digital map. For instance, the size of the table may be scaled down to fit within EOC settings that have limited space. One such setting where space is restricted is in mobile EOCs, see FIG. 4. Here smaller tables are used in order to fit within the limited available space. To ensure the present invention works with any sized table, software has been developed to adjust the map to fit a specific map table or map platform. The software projects a map from below the map table onto a front coated mirror needed to reduce distortion and from there to the map platform.

The display surface or map area 240 is of a sufficient size to accept and retain either a digital map or a paper map printed in a standard size. In general, the display surface or map area 240 may be about 22"×36" and may be white or accommodate a white-dry erase board. The map area 240 provides a surface on which the digital map and the control points are displayed via the overhead projector (not shown). The overhead projector is disposed over the table 210 at a position to display properly oriented or geo-referenced maps and/or control points on the map area 240.

The capture device 250 captures markup data made on a map disposed in the map area 240. The capture device may be a computer whiteboard capture device that allows the users 230 to work with regular whiteboard markers. Other capture devices may be employed such as cameras. One suitable capture device 250 is a whiteboard capture device called mimio®, headquartered in Cambridge, Mass. mimio® interactive+capture allows a user to annotate a map by marking the map area 240. The capture device 250 may use input devices such as stylus pens to permit all annotation made by the users 230 to be digitally recorded often times in color and in real-time.

The mimio® interactive +capture device includes a capture bar and four trackable marker jackets. The mimio® marker jackets hold either a regular whiteboard marker or a placeholder marker. The placeholder marker is a blank marker insert which allows the user to create markup without using a whiteboard marker. Accordingly, the placeholder marker may be useful when writing on non-white board surfaces or when using the mimio® marker jacket as a mouse. The mechanism of the mimio® marker jackets are outside the realm of this invention, however it can be said that the mimio® marker jackets possess an ultrasonic transducer and infrared LEDs that emit signals that may be captured by the capture device 250. By using stylus pens with the capture device 250, natural hand-motions may be used as input to manipulate information displayed on the table 210.

As an alternative means of capturing markup information, a Logitech® io™ 2 Digital Pen may be employed to annotate maps and capture such annotations digitally. The device uses a pen with a small built in camera and internal memory and a USB docking base. Special paper with a grid surface is used with the pen to permit the camera to record the movements. Docking the digital pen in its cradle permits written information to be automatically stored in a computer and saved as a text or an image. Some models may have Bluetooth capabilities. Another alternative capture technology means includes that may be employed is a MERL DiamondTouch table. DiamondTouch is manufactured by MERL (Mitsubishi Electric Research Laboratories), in Cambridge, Mass. The above cited capture technologies are non-limiting examples of devices that may be used with the present invention.

Regardless of whether the map employed is digital or paper, all markup data or annotations will be drawings, writings and symbols made on the map along with the image of the map, the control points and the extents. When saved, the markup data should be stored in a file separate from the map and should be a compact file. A notable feature of the present invention is that the capture device 250 will be able to work even after a power outage. The present invention may use a battery back-up followed by a generator to provide power to the invention. If the present invention is employed using a laptop, the laptop will have a backup battery to provide additional power when necessary. The unpredictability of a disaster situation and the likelihood of downed electrical lines require that devices used in EOCs will be able to work in the absence of power. It should be noted that the present invention not only provides a means for making markups on digital or printed maps, but also provides a means for displaying real time data and markup files.

Figure 3:
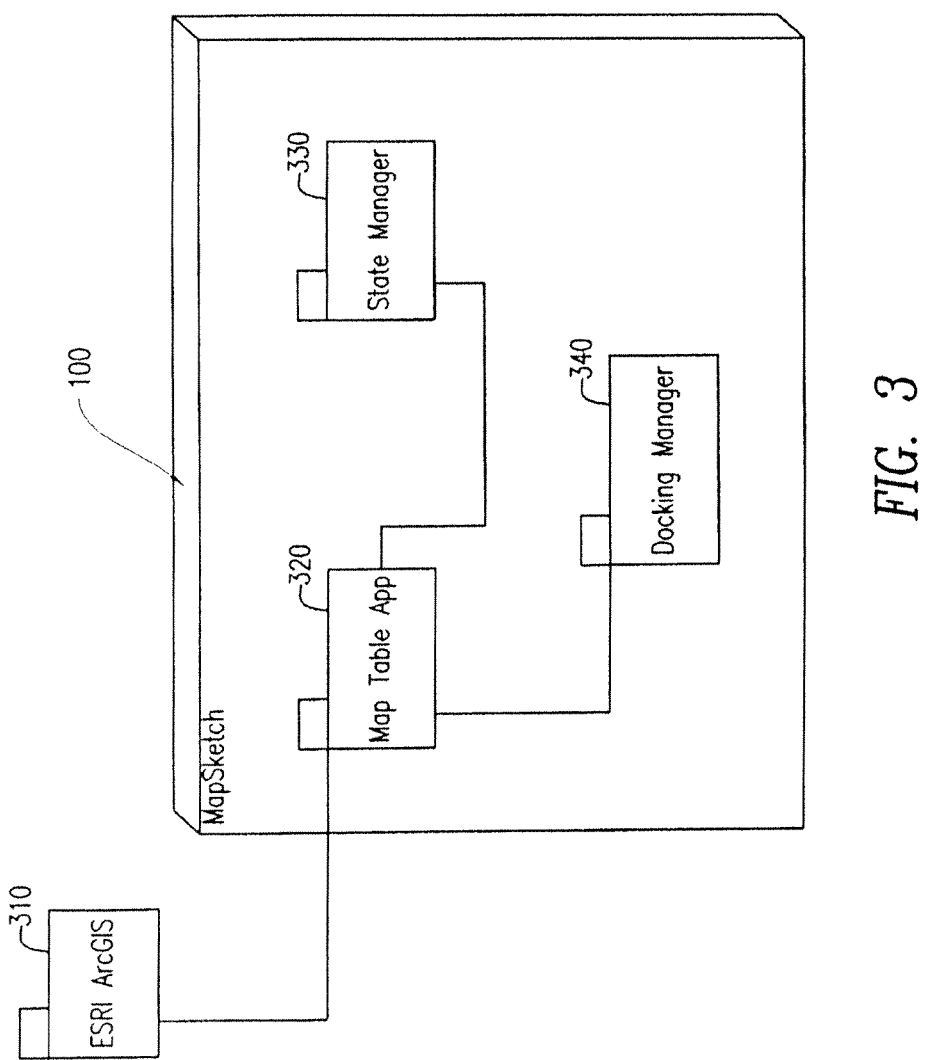
FIG. 3 illustrates a flowchart showing the software components of the present invention.

FIG. 3 shows a high level software design for the present invention. An API used in the present invention is an ArcGIS 310, produced by ESRI, of Redland, Calif. The ArcGIS 310 is a suite of geographic information system (GIS) applications that allows users to view maps, create layers, analyze spatial information and share data. ArcGIS 310 includes a set of APIs that allow developers to create customized mapping applications using the ArcGIS components as its foundation. In developing the present invention, MapSketch 100, ArcGIS MapControl is used to display digital maps and layers. As users 230 create markups, the markup data is saved in an ESRI shapefile format, which is in open source format. In the present invention, markup data is saved using polyline and point shapefiles.

FIG. 3 shows MapSketch 100 having at least three software packages, MapTableApp 320, StateManager 330, and DockingManager 340. Each of these three software packages were custom developed for the present invention. The MapTableApp 320 contains classes that interface with the ESRI API and handle displaying maps and shapefiles as well as saving markup data as shape files. MapTableApp 320 holds all graphical user interfaces such as toolbars, forms and PaperMapWizard. The classes within the MapTableApp 320 include the following: MapTable Main, MarkUp, OpenADigitalMap, OpenAPaperMap, ShapefileBusiness, PaperMapWizard, StartUpForm, StateManager, DockingManager. Included are options to network views to other monitors in real time or send email, FTP, cellular service, satellite, WiFi, broadband, narrowband and the like to active devices. FIG. 6 shows an email configuration of final data. FIG. 7 shows real time multiple displays between networked sites while the data is being generated.

MapTable Main contains tools and controls presented to the user and handles tool click events and updates the StateManager class when a new state is entered. It also serves to set up appropriate layers and shapefiles to be displayed to users 230 and provide either digital or paper maps when requested. The MarkUp class deals with the animation of drawing a line to show a "freehand" look to the line rather than a jagged line. The OpenADigitalMap class is a form that displays the digital map when selected. The OpenAPaperMap class is a form that displays the paper map when selected. The ShapefileBusiness class interfaces with ESRI to create, open, edit and save shapefiles.

The PaperMapWizard class contains the GUI form to guide the user through the process of registering paper maps in the system. This class also guides the user to create PaperMapLayer, the special markup layer mentioned above. The PaperMapLayer contains three points that reference three control points on the map. The StartUpForm class contains the first screen displayed to the user when they open up the MapSketch application. This screen gives the user the option of selecting between a digital map or a paper map.

The StateManager 330 class manages the current state of the MapSketch application, and has four states: LineState, PointState, MouseState and PaperMapWizardState. LineState is used when the system is in the process of drawing a line. PointState is used when the user is drawing point markup data and MouseState is active when no tool is selected. The DockingManager 340 controls the layout of the various toolbars used in the present invention 100. It also allows for moving the toolbars and docking them on the edges of the screen.

A user interface of the present invention 100 will most likely not mimic that of a conventional computer map displayed on a monitor and manipulated by a mouse, but may include all or some conventional features. The user interface includes user input controls such as a control switch between cursor, line-drawing and point-drawing as well as controls to invoke the PaperMapWizard, Save & Exit the application. Large icons may be used to facilitate easy identification and use.

As mentioned above, the markup files should be small in size to allow rapid transmission across a narrow-band network. The compact file is also geo-referenced so it will display correctly on any map. Once the markup data is digitally stored it may be communicated to first responders for viewing via handheld PDAs and similar devices. The markup may also be in color or the map may be created using predefined symbols for incident managers to place on the map.

In another embodiment, the present invention may be used in gathering information about a building's layout. Here, insight about the layout of a floor or of an entire building may be important in locating victims during a fire, hostage situations, or other emergencies. Building maps or plans may be obtained, viewed and marked up to convey location information to responders. The location of victims or exit routes may be critical in saving individuals caught in a building during above described situations.

The present embodiment described using building plans is similar to the embodiment described above using land maps. The MapSketch application is initiated where the user selects a building map or floor plan or layout in either a digital or paper format. The floor plans may be developed from scratch, but in some embodiments the floor plans may be acquired from commercial entities one such entity is FloorView, LLC. Once the appropriate building plan is selected and displayed, users in the EOC can view rooms, hallways, evacuation routes, etc. and create mark up data directly on the building plan. The mark up data or notations are then stored and sent to the first responder via rapid transmission. The information conveyed to the responders may be extremely helpful in pinpointing the location of an armed attacker or victims, the location of a fire or evacuation routes.

We claim:

1. A non-transitory recording medium having recorded therein a program that allows a computer to perform a process of conveying map annotations, said process comprising the steps of:

selecting a digital map;

retrieving map coordinates for said digital map, said map coordinates being map coordinates;

providing a display surface, wherein said display surface has display coordinates and at least one display surface control point;

showing said digital map on said display surface at a first location, wherein said display surface control point is visible through said digital map shown on said display surface;

marking at least one digital map control point on said digital map, said marking entailing identifying said display surface control point shown through said digital map;

saving said map coordinates, and said marked digital map control point in a file;

saving said digital map in a second file;

printing said file and said second file as a printed paper map, said printed paper map including said map coordinates of said digital map and said marked digital map control point;

displaying said printed paper map on said display surface at a first location;

aligning said marked digital map control point of said printed paper map with said display surface control point of said display surface;

annotating said printed paper map with an input device, said annotations being defined within said display coordinates in view of movement of said input device captured in relation to said display coordinates;

geo-referencing said display coordinates of said annotations with said map coordinates of said printed paper map, wherein , in view of said alignment of said printed paper map with said display surface, said geo-referencing matches said map coordinates of said printed paper map that correspond with said display coordinates of said annotations thereby defining map coordinates of said map annotations;

producing a geo-referenced file;

saving the geo-referenced file, wherein said saved geo-referenced file comprises said annotations and said map coordinates of said map annotations;

transmitting said saved file from the first location to a second location; and displaying said transmitted file on a copy of said printed paper map shown on a second display surface at the second location, said copy having copy coordinates, said copy coordinates matching said map coordinates of said printed paper map, wherein said map coordinates of said annotations are preserved when displaying said transmitted file on the copy of said printed paper map.

* * * * *